(12) United States Patent
Bajaj

(10) Patent No.: US 10,275,321 B1
(45) Date of Patent: Apr. 30, 2019

(54) BACKUP AND RESTORE OF LINKED CLONE VM

(71) Applicant: Cohesity, Inc., Santa Clara, CA (US)

(72) Inventor: Rupesh Bajaj, Dewas (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 15/991,766

(22) Filed: May 29, 2018

(51) Int. Cl.
*G06F 11/14* (2006.01)
*G06F 17/30* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 11/1469* (2013.01); *G06F 17/30961* (2013.01); *G06F 2009/45562* (2013.01); *G06F 2201/815* (2013.01); *G06F 2201/84* (2013.01)

(58) Field of Classification Search
CPC ............ G06F 11/1451; G06F 11/1464; G06F 9/45558; G06F 11/1469; G06F 17/30961
USPC ........................................................ 711/162
See application file for complete search history.

(56) References Cited

U.S. PATENT DOCUMENTS 9,189,342 B1 * 11/2015 von Thenen ........ G06F 9/45558

* cited by examiner

*Primary Examiner* — Hua J Song
(74) *Attorney, Agent, or Firm* — Van Pelt, Yi & James LLP

(57) ABSTRACT

A request associated with restoring a previous version of a linked clone virtual machine is received. One or more changes between a base image of a parent virtual machine and the previous version of the linked clone virtual machine are determined. One or more data blocks corresponding to the base image and one or more data blocks corresponding to the determined changes are provided to a remote system.

11 Claims, 11 Drawing Sheets

BACKUP AND RESTORE OF LINKED CLONE VM

BACKGROUND OF THE INVENTION

A full clone is an independent copy of a virtual machine (VM) that shares nothing with the parent VM after the cloning operation. Ongoing operation of a full clone is entirely separate from the parent VM. A linked clone is a copy of a VM that shares virtual disks with the parent VM in an ongoing manner. This conserves disk space, and allows multiple VMs to use the same software installation.

BRIEF DESCRIPTION OF THE DRAWINGS

Various embodiments of the invention are disclosed in the following detailed description and the accompanying drawings.

DETAILED DESCRIPTION

Figure 1:
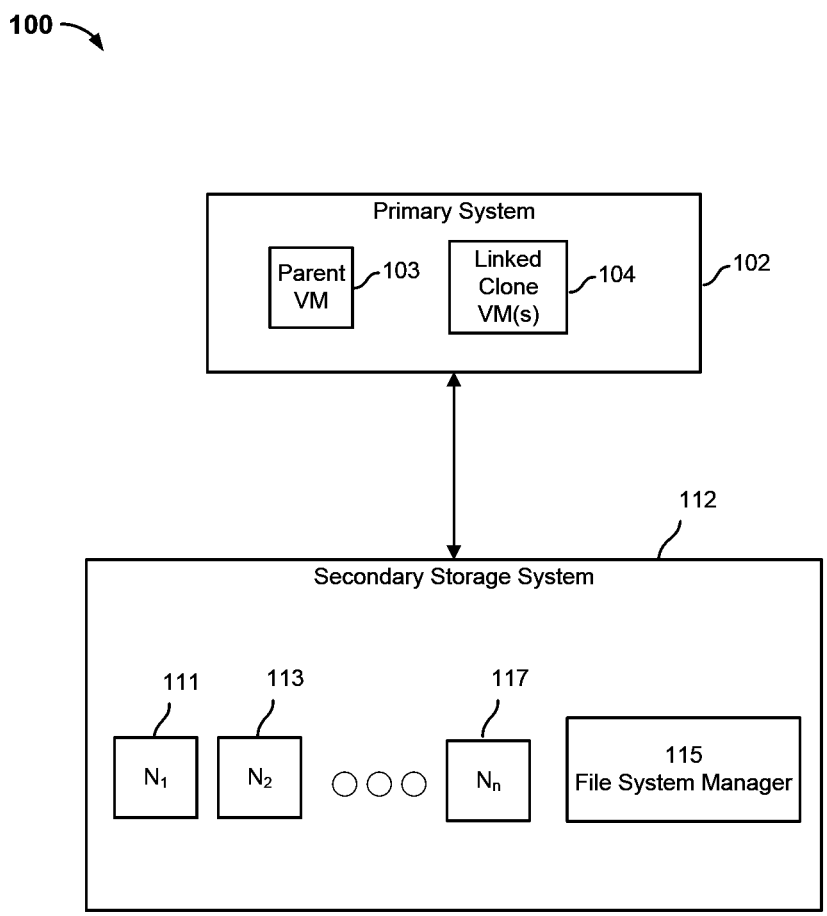
FIG. 1 is a block diagram illustrating an embodiment of a system for backing up and restoring a linked clone VM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional systems are capable of backing up a linked clone VM, but they are unable to restore the linked clone VM as a linked clone. For example, when backing up a linked clone VM, a conventional system may backup the entire VM, including its base disk. Thus, the conventional system has lost the information that VM that was backed up is a linked clone VM. When the VM is restored, the VM is restored as a full clone.

Other systems may perform a copy of a base image of a linked clone VM and then copy the incremental backup of the linked clone VM separately. The linked clone is able to be restored as a linked clone. However, such an approach may require restoring a plurality of linked clones to restore the VM to a desired version of a linked clone VM. For example, suppose a plurality of linked clone VM backups S1, S2, S3, and S4 were performed at $t_1$, $t_2$, $t_3$, and $t_4$, respectively. To restore the linked clone VM to time $t_3$, a base image is initially copied and then the deltas S1, S2, and S3 are applied to the base image to recover the VM to time $t_3$. Such an approach may take a long time to perform depending on the size of the deltas.

Other systems may restore a VM by receiving a base image of the VM from a user, comparing the data of a backed up VM with the base image, and restoring the data that is not shared between the base image and the backed up VM. However, such an approach requires the data from both the user supplied base image and the backed up linked clone VM to be read. This may require a long time to perform (e.g., hours, days, weeks, etc.) depending on the size of the user supplied base image and the backed up linked clone VM (e.g., GBs, TBs, etc.). If a user is unable to supply a base image, then the linked clone VM will be restored as a full cloned VM.

A technique to backup and restore a linked clone VM is disclosed. A base image of a VM (e.g., parent VM) is received and stored at a secondary storage system. The base image is comprised of a plurality of data blocks. The plurality of data blocks may be organized using a tree data structure, such as a snapshot tree (e.g., Cohesity Snaptree). The snapshot tree enables a backup of a linked clone VM to be a fully hydrated backup. The snapshot tree may be used to capture different versions of the linked clone VM at different moments in time. The tree data structure may allow a chain of snapshot trees to be linked together by allowing a node of a later version of a snapshot tree to reference a node of a previous version of a snapshot tree (e.g., a "snapshot tree forest"). For example, a first snapshot tree may correspond to a VM base image (e.g., base image of parent VM), a second snapshot tree may correspond to a first linked clone VM, and a third snapshot tree may correspond to a second linked clone VM. A node of the second snapshot tree may reference a node of the first snapshot tree. A node of the third snapshot tree may reference a node of the first snapshot tree or the second snapshot tree.

A snapshot tree includes a root node, one or more levels of one or more intermediate nodes associated with the root node, and one or more leaf nodes associated with an intermediate node of the lowest intermediate level. A root node or an intermediate node of a version of a snapshot tree may reference an intermediate node or a leaf node of a previous version of a snapshot tree. The root node of a snapshot tree includes one or more pointers to one or more intermediate nodes. Each intermediate node includes one or more pointers to other nodes (e.g., a lower intermediate node or a leaf node). Each time a backup of a linked clone VM is received by the secondary storage system, a corresponding snapshot tree is created. The corresponding snapshot tree is created by cloning the last snapshot tree. Cloning the last snapshot tree includes creating a new root node where the new root node includes the set of pointers included in the root node of the last snapshot tree, that is, the new root node includes one or more pointers to an intermediate node or leaf node associated with the last snapshot tree. The new root node also includes a view identifier (e.g., TreeID) that is different than the view identifier of the last root node. Each node of a snapshot tree has a corresponding view identifier. The view identifier associated with a node identifies a view with which the node is associated, e.g., the associated linked clone VM. A leaf node may store VM metadata, one or more data blocks, an identifier of one or more data blocks, a pointer to a file tree, or a pointer to a data block stored on the secondary storage system. A leaf node may correspond to a data brick. The data brick may have a corresponding brick number.

The VM data of a VM may be segmented into a plurality of data bricks. A data brick may be comprised of one or more data blocks. A leaf node of a snapshot tree corresponds to a data brick. A write to the VM data may occur since a last linked clone VM backup, such that a portion of a data brick is modified (e.g., one of the one or more data blocks comprising the data brick is modified). When a subsequent linked clone VM backup is performed, the snapshot tree corresponding to the subsequent linked clone backup VM is modified to reflect the data brick modification. The snapshot tree corresponding to the subsequent linked clone VM backup is traversed from the new root node to the leaf node corresponding to the data brick that was modified. When traversing the snapshot tree corresponding to the subsequent linked clone VM backup the view identifier associated with a node is compared to the view identifier associated with the root node of the subsequent linked clone VM backup. In the event the view identifier associated with the node does not match the view identifier associated with the root node of the subsequent linked clone VM backup, a copy of the non-matching node is created. The node copy includes the same set of pointers as the non-matching node, but includes a view identifier that is the same as the root node of the subsequent linked clone VM backup. A pointer of the node that points to the non-matching node is updated to point to the node copy instead of the non-matching node. When the leaf node corresponding to the data brick that was modified is reached, a copy of the leaf node is created. A pointer of the leaf node is updated to point to the modified data brick instead of the data brick that was modified. A pointer of a node that references the leaf node that was copied is updated to point to the leaf node copy.

The manner in which a snapshot tree is modified as described above allows data blocks that were modified since the base image backup to be easily identified. For example, a first snapshot tree may be associated with a base image of a VM. Each node of the first snapshot tree has a view identifier (e.g., TreeID=1) that indicates the node is associated with the base image. A second snapshot tree may be associated with a linked clone VM backup. The second snapshot tree corresponding to the linked clone VM backup may have one or more nodes associated with the base image and one or more nodes associated with the linked clone VM backup. The one or more nodes associated with the linked clone VM backup may be identified based on the view identifier. In the event the view identifier of a node matches the view identifier of the root node associated with the linked clone VM backup, then the node is associated with the linked clone VM backup. A nth snapshot tree may be associated with a nth linked clone VM backup. The nth snapshot tree corresponding to the nth linked clone VM backup may have one or more nodes associated with the base image, one or more nodes associated with the first linked clone VM backup, one or more nodes associated with the linked clone VM backups between the first linked clone VM backup and the nth linked clone VM backup, and/or one or more nodes associated with the nth linked clone VM backup. The one or more nodes associated with the nth linked clone VM backup may be identified based on the view identifier. In the event the view identifier of a node matches the view identifier of the root node associated with the nth linked clone VM backup, then the node is associated with the nth linked clone VM backup.

A VM of a primary system may be restored to a linked clone VM backup version by determining the one or more data blocks that have changed between the base image and the linked clone VM backup version to be restored.

The one or more data blocks that have changed between the base image and the linked clone VM backup version to be restored may be determined by traversing a snapshot tree associated with the linked clone VM backup version to be restored and a snapshot tree associated with the base image. The one or more leaf nodes that are included in the snapshot tree associated with linked clone VM backup version to be restored, but are not included in the snapshot tree associated with the base image are determined. The determined leaf nodes correspond to data bricks. The data bricks correspond to the one or more data blocks that have changed between the linked clone VM backup version to be restored and the base image. The data bricks comprising the one or more data blocks that have changed between the linked clone VM backup version to be restored and the base image are provided to the primary system.

In response to receiving the data bricks comprising the one or more data blocks that have changed between the linked clone VM backup version to be restored and the base image the primary system may apply the data blocks to restore the VM as a linked clone VM at the particular moment in time.

Such an approach is an improvement over conventional systems because it reduces the amount of time and resources needed to restore a linked clone VM since the entire volume of a VM does not need to be read. Also, the linked clone VM is restored as an actual linked clone VM, not as a full clone as performed by conventional systems. Furthermore, this approach also reduces the amount of time to restore a linked clone VM because the deltas of linked clone VM backups do not need to be incrementally applied to restore a linked clone VM.

FIG. 1 is a block diagram illustrating an embodiment of a system for backing up and restoring a linked clone VM. In the example shown, system 100 includes a primary system 102 and a secondary storage system 112.

Primary system 102 is comprised of a parent VM 103 and one or more linked clone VMs 104. The parent VM 103 includes a base image VM. Each VM of the one or more linked clone VMs 104 includes corresponding VM data. Primary system 102 may be configured to backup VM data (e.g., data from the parent VM and/or the linked clone VMs) to secondary storage system 112 according to one or more backup policies. In some embodiments, a backup policy indicates that a linked clone VM is to be backed up on a periodic basis (e.g., hourly, daily, weekly, monthly, etc.). In other embodiments, a backup policy indicates that a linked clone VM is to be backed up when a threshold size of data has changed. In other embodiments, a backup policy indicates that a linked clone VM is to be backed up upon a command from a user associated with primary system 102. The backup policy may indicate when a full backup snapshot of the linked clone VM is to be performed and when an incremental backup snapshot of the linked clone VM is to be performed. For example, the backup policy may indicate that a full backup snapshot is to be performed according to a first schedule (e.g., weekly, monthly, etc.) and an incremental backup snapshot is to be performed according to a second schedule (e.g., hourly, daily, weekly, etc.) The backup policy may indicate that a full backup snapshot is to be performed after a threshold number of incremental backup snapshots have been performed. The one or more VMs 104 may be backed up according to different backup policies. For example, a first VM may be backed up according to a first backup policy and a second VM may be backed up according to a second backup policy.

Primary system 102 is configured to send one or more data blocks associated with a backup snapshot of a linked clone VM to secondary storage system 112. The backup snapshot may be a full backup snapshot or an incremental backup snapshot. In the event the backup snapshot is a full backup snapshot, the data blocks of the entire volume associated with a linked clone VM are sent to secondary storage system 112. In the event the backup snapshot is an incremental backup snapshot, the data blocks of the linked clone VM that were modified since the last backup snapshot (full or incremental) are sent to secondary storage system 112.

The one or more data blocks may be sent from primary system 102 to secondary storage system 112 over a network. The network may be one or more of the following: a local area network, a wide area network, a wired network, a wireless network, the Internet, an intranet, or any other appropriate communication network. Primary system 102 may be comprised of one or more servers, one or more computing devices, one or more storage devices, and/or a combination thereof.

Secondary storage system 112 is a storage system configured to backup and store linked clone VM data received from primary system 102. Secondary storage system 112 is configured to store the linked clone VM data and organize the linked clone VM data in a tree data structure. An example of the tree data structure is a snapshot tree (e.g., Cohesity Snaptree), which may be based on a B+ tree structure (or other type of tree structure in other embodiments). The snapshot tree enables a snapshot backup to be a fully hydrated snapshot backup. The snapshot tree may be used to capture different versions of linked clone VM data at different moments in time. For example, a first snapshot tree may correspond to a first backup snapshot and a second snapshot tree may correspond to a second backup snapshot. In some embodiments, the tree data structure allows a chain of snapshot trees (i.e., different snapshot tree versions) to be linked together by allowing a node of a later version of a snapshot tree to reference a node of a previous version of a snapshot tree (e.g., a "snapshot tree forest"). For example, a node of the second snapshot tree corresponding to the second backup snapshot may reference a node of the first snapshot tree corresponding to the first backup snapshot.

Secondary storage system 112 may be comprised of one or more solid state drives, one or more hard disk drives, or a combination thereof. Secondary storage system 112 may include a file system manager 115. File system manager 115 is configured to maintain linked clone VM data in the form of nodes arranged in a tree data structure. In some embodiments, leaf nodes in the file system tree include key-value pairs that associate data keys with values in the form of particular items of linked clone VM data. File system manager 115 may be configured to perform one or more modifications, as disclosed herein, to a snapshot tree.

Secondary storage system 112 is comprised of a plurality of N storage nodes 111, 113, 117. In some embodiments, N is an odd number. Secondary storage system 112 may receive a backup snapshot (e.g., full or incremental) from primary system 102. The backup snapshot represents the state of one of the one or more linked clone VMs 104 at a particular moment in time. Secondary storage system 112 may store the one or more data blocks associated with a backup snapshot across the plurality of nodes 111, 113, 115.

Figure 2A:
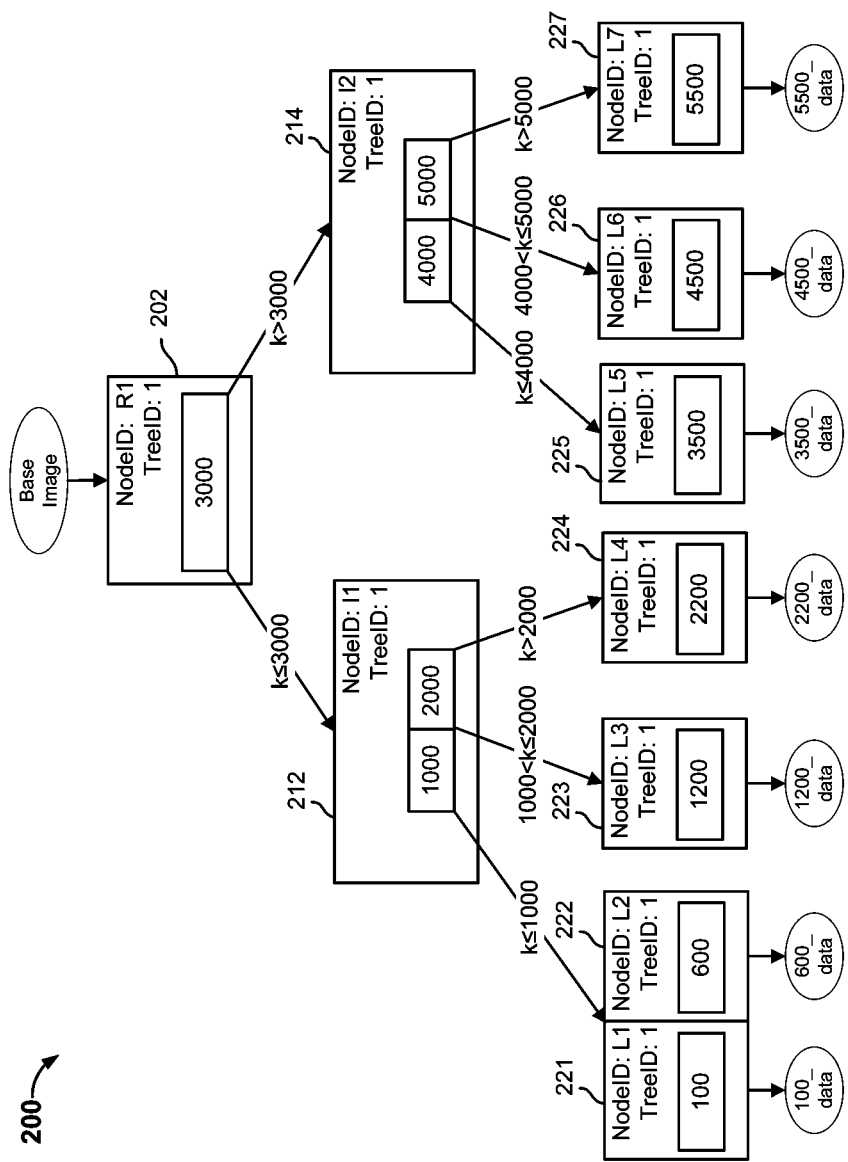
FIG. 2A is a diagram illustrating an embodiment of a tree data structure storing VM data.

FIG. 2A is a diagram illustrating an embodiment of a tree data structure storing VM data. In the example shown, tree data structure 200 may be created by a file system manager, such as file system manager 115 of secondary storage system 112. The VM data of a VM, such as the parent VM 103 or one of the one or more linked clone VMs 104 may be backed up to a secondary storage system, such as secondary storage system 112. The primary system may perform a backup snapshot to back up the VM data. The backup snapshot may correspond to a full backup snapshot or an incremental backup snapshot. The manner in which the VM data is stored in secondary storage system may be represented by a corresponding tree data structure, such as tree data structure 200.

In the example shown, tree data structure 200 may be a snapshot tree that includes a root node 202, intermediate nodes 212, 214, and leaf nodes 221, 222, 223, 224, 225, 226, 227. Although tree data structure 200 includes one intermediate level between root node 202 and leaf nodes 221, 222, 223, 224, 225, 226, 227, there may be any number of intermediate levels in a snapshot tree. Tree data structure 200 may be a snapshot tree of VM data at a particular point in time t and correspond to a particular version of a snapshot tree. The tree data structure may correspond to a base image of a VM. For example, tree data structure 200 may correspond to a "base image" of VM data.

Root node 202 is associated with the snapshot of the VM data at a particular point in time t. In some embodiments, the VM data is metadata for a virtual machine system and may include information, such as file size, directory structure, file permissions, physical storage location of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree (e.g., file tree). A leaf node may store key-value pairs of VM data. A data key k is a lookup value by which a particular leaf node may be accessed. A file may be comprised of one or more data blocks. The file may be divided into a plurality of equal size blocks called bricks. The lookup value may correspond to a brick number. For example, "100" is a data key that may be used to lookup "100 data" of leaf node 221. Examples of values stored by a leaf node include, but are not limited to, file size, directory structure, file permissions, physical storage locations of the files, etc. A leaf node may store a data key k and a pointer to a location that stores the value associated with the data key. The value may correspond to a data brick comprising one or more data blocks.

A root node or an intermediate node may include one or more node keys. The node key may be an integer value or a non-integer value. The node key may correspond to a brick number. Each node key indicates a division between the branches of the node and indicates how to traverse the tree data structure to find a leaf node, i.e., which pointer to follow. For example, root node 202 may include a node key of "3000." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "100," "600," "1200," or "2200," the first branch of root node 202 would be traversed to intermediate node 212 because the data keys of "100," "600," "1200," and "2200" are less than or equal to the node key "3000." To find a leaf node storing a value associated with a data key of "3500," "4500," or "5500," the second branch of root node 202 would be traversed to intermediate node 214 because data keys "3500," "4500," and "5500" are greater than the node key of "3000."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4000." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the backup snapshot/view with which the node is associated. When a change is made to data associated with a leaf node as described with respect to FIGS. 2B, 2C, and 2D, the TreeID may be used to determine which backup snapshot the change is associated (i.e., when did the change occur).

Root node 202 includes a node key that divides a set of pointers into two different subsets. Leaf nodes (e.g., L1, L2, L3, L4) with a data key k that is less than or equal to the node key are associated with a first branch and leaf nodes (e.g., L5, L6, L7) with a data key k that is greater than the node key are associated with a second branch. Leaf nodes with a data key of "100," "600," "1200," or "2200" may be found by traversing tree data structure 200 from root node 202 to intermediate node 212 because the data keys have a value that is less than or equal to the node key. Leaf nodes with a data key of "3500," "4500," or "5500" may be found by traversing tree data structure 200 from root node 202 to intermediate node 214 because the data keys have a value that is greater than the node key.

Root node 202 includes a first set of pointers. The first set of pointers associated with a data key less than the node key (e.g., "100", "600," or "1200") indicates that traversing tree data structure 200 from root node 202 to intermediate node 212 will lead to a leaf node with a data key of "100," "600," "1200," or "2200." Intermediate node 214 includes a second set of pointers. The second set of pointers associated with a data key greater than the node key indicates that traversing tree data structure 200 from root node 202 to intermediate node 214 will lead to a leaf node with a data key of "3500," "4500," or "5500."

Intermediate node 212 includes pointers to leaf nodes 221, 222, 223, 224. Intermediate node 212 includes a NodeID of "I1" and a TreeID of "1." Intermediate node 212 includes a first node key of "1000" and a second node key of "2000." The data key k for leaf nodes 221, 222 is a value that is less than or equal to the first node key. The data key k for leaf node 223 is a value that is greater than the first node key and less than or equal to the second node key. The data key k for leaf node 224 is a value that is greater than the second node key. The pointer to leaf nodes 221, 222 indicates that traversing tree data structure 200 from intermediate node 212 to leaf nodes 221, 222 will lead to the node with a data key of "100" or "600." The pointer to leaf node 223 indicates that traversing tree data structure 200 from intermediate node 212 to leaf node 223 will lead to the node with a data key of "1200." The pointer to leaf node 224 indicates that traversing tree data structure 200 from intermediate node 212 to leaf node 224 will lead to the node with a data key of "2200."

Intermediate node 214 includes pointers to leaf nodes 225, 226, 227. Intermediate node 212 includes a NodeID of "I2" and a TreeID of "1." Intermediate node 214 includes a first node key of "4000" and a second node key of "5000." The data key k for leaf node 225 is a value that is less than or equal to the first node key. The data key k for leaf node 226 is a value that is greater than the first node key and less than or equal to the second node key. The data key k for leaf node 227 is a value that is greater than the second node key. The pointer to leaf node 225 indicates that traversing tree data structure 200 from intermediate node 214 to leaf node 225 will lead to the node with a data key of "3500." The pointer to leaf node 226 indicates that traversing tree data structure 200 from intermediate node 214 to leaf node 226 will lead the node with a data key of "4500." The pointer to leaf node 227 indicates that traversing tree data structure 200 from intermediate node 214 to leaf node 227 will lead the node with a data key of "5500."

A file may be comprised of a plurality of data blocks. The file may be divided into a plurality of fixed size data blocks called bricks. Information associated with a brick for a file may be kept in the tree data structure. For example, a leaf node may correspond to a brick and include a pointer to a location of the corresponding one or more data blocks stored in the brick. Given an offset in a file, the brick number may be determined by dividing the file offset by a brick size. The brick number may correspond to a data key k for a leaf node.

Leaf node 221 includes a data key of "100," which corresponds to brick number 100. Leaf node 221 also includes a pointer to the corresponding data brick "100 data." Leaf node 221 also includes NodeID of "L1" and a TreeID of "1." To view the data brick associated with a data key of "100," tree data structure 200 is traversed from root node 202 to intermediate node 212 to leaf node 221.

Leaf node 222 includes a data key of "600," which corresponds to brick number 600. Leaf node 222 also includes a pointer to the corresponding data brick "600 data." Leaf node 222 also includes NodeID of "L2" and a TreeID of "1." To view the data brick associated with a data key of "600," tree data structure 200 is traversed from root node 202 to intermediate node 212 to leaf node 222.

Leaf node 223 includes a data key of "1200," which corresponds to brick number 1200. Leaf node 223 also includes a pointer to the corresponding data brick "1200 data." Leaf node 223 also includes NodeID of "L3" and a TreeID of "1." To view the data brick associated with a data key of "1200," tree data structure 200 is traversed from root node 202 to intermediate node 212 to leaf node 223.

Leaf node 224 includes a data key of "2200," which corresponds to brick number 2200. Leaf node 224 also includes a pointer to the corresponding data brick "2200 data." Leaf node 224 also includes NodeID of "L4" and a TreeID of "1." To view the data brick associated with a data key of "2200," tree data structure 200 is traversed from root node 202 to intermediate node 212 to leaf node 224.

Leaf node 225 includes a data key of "3500," which corresponds to brick number 3500. Leaf node 225 also includes a pointer to the corresponding data brick "3500 data." Leaf node 225 also includes NodeID of "L5" and a TreeID of "1." To view the data brick associated with a data key of "3500," tree data structure 200 is traversed from root node 202 to intermediate node 214 to leaf node 225.

Leaf node 226 includes a data key of "4500," which corresponds to brick number 4500. Leaf node 226 also includes a pointer to the corresponding data brick "4500 data." Leaf node 226 also includes NodeID of "L6" and a TreeID of "1." To view the data brick associated with a data key of "4500," tree data structure 200 is traversed from root node 202 to intermediate node 214 to leaf node 226.

Leaf node 227 includes a data key of "5500," which corresponds to brick number 5500. Leaf node 227 also includes a pointer to the corresponding data brick "5500 data." Leaf node 227 also includes NodeID of "L7" and a TreeID of "1." To view the data brick associated with a data key of "5500," tree data structure 200 is traversed from root node 202 to intermediate node 214 to leaf node 227.

Figure 2B:
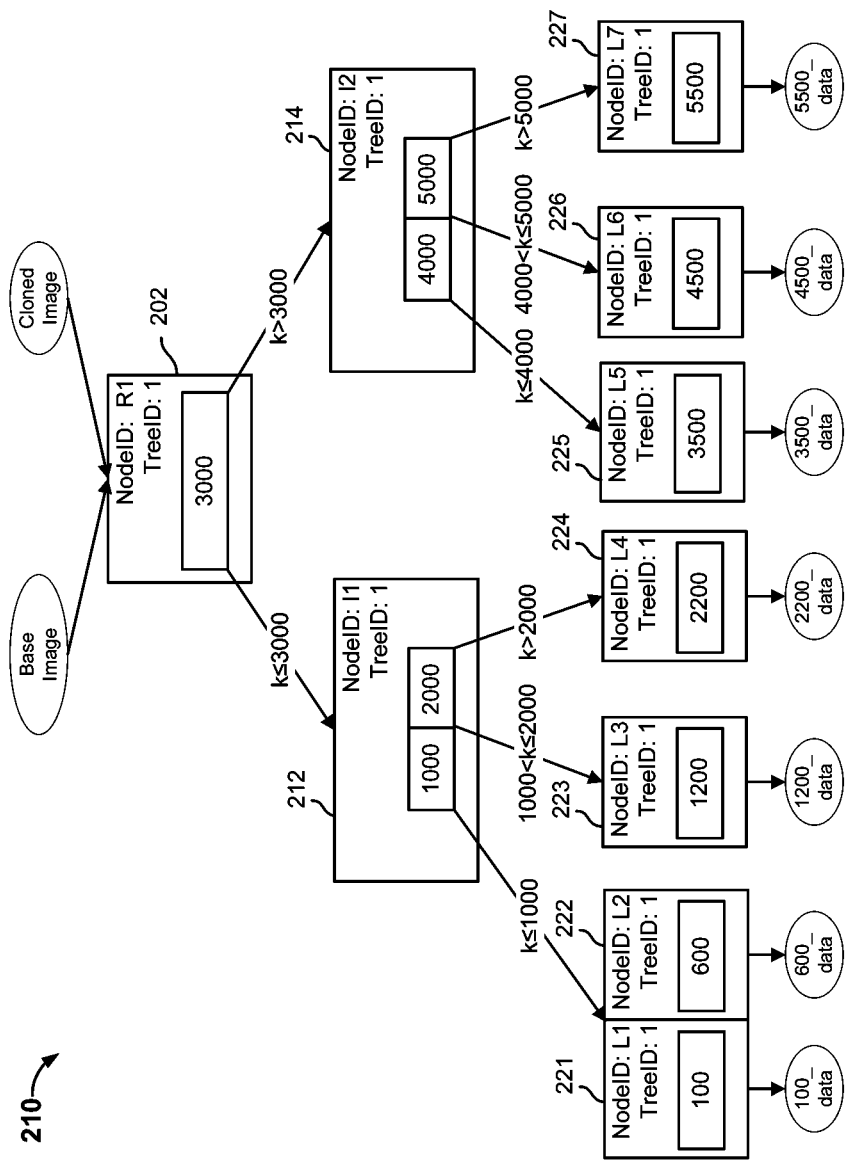
FIG. 2B is a diagram illustrating an embodiment of a cloned image.

FIG. 2B is a diagram illustrating an embodiment of a cloned image. A cloned image may be represented as a tree data structure, such as tree data structure 210. In some embodiments, tree data structure 210 may be created by a file system manager, such as file system manager 115 of secondary storage system 112. The VM data of a VM, such as the parent VM or one of the one or more linked cloned VMs 104, may be initially backed up to a secondary storage system, such as secondary storage system 112, and represented in a tree data structure, such as tree data structure 200. A subsequent backup snapshot of a linked clone VM may be performed. A subsequent backup snapshot of the linked clone VM may correspond to a full backup snapshot or an incremental backup snapshot. The manner in which the VM data corresponding to the subsequent backup snapshot is stored in secondary storage system may be represented by a tree data structure. The tree data structure corresponding to the subsequent backup snapshot is created by cloning a snapshot tree associated with a last snapshot tree. In the example shown, the last snapshot tree is the snapshot tree associated with the base image, but the last snapshot tree may be a snapshot tree associated with other linked clone VM backups. The one or more changes to the VM data corresponding to the subsequent backup snapshot may be represented in the snapshot tree associated with the cloned image.

In the example shown, tree data structure 210 includes root node 202, intermediate nodes 212, 214, and leaf nodes 221, 222, 223, 224, 225, 226, and 227. Root node 202, intermediate nodes 212, 214, and leaf nodes 221, 222, 223, 224, 225, 226, and 227 are associated with a last backup snapshot, for example, "Base Image." When a new backup snapshot is performed, a clone of a last snapshot tree is generated. The clone of the last snapshot tree may be generated by causing the new backup snapshot to point to a root node associated with the last backup snapshot. In the example shown, the new backup "Cloned Image" initially points to root node 202, which is the root node associated with the last backup snapshot "Base Image."

Figure 2C:
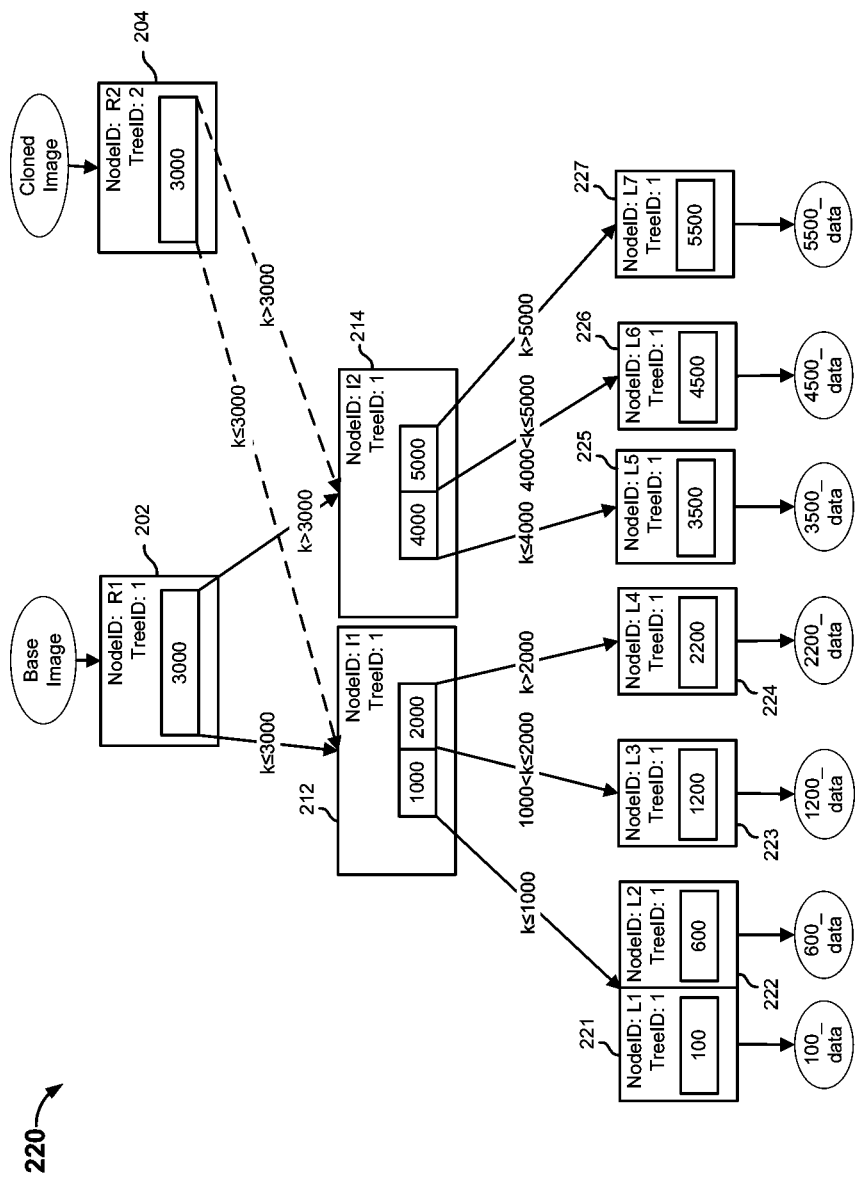
FIG. 2C is a diagram illustrating an embodiment of a modified cloned snapshot tree.

FIG. 2C is a diagram illustrating an embodiment of a modified cloned snapshot tree. In the example shown, tree data structure 220 may be modified by a file system manager, such as file system manager 115. One or more VM files associated with a linked clone VM and stored on a primary system may be added, modified, and/or deleted since a last backup snapshot. A subsequent backup snapshot corresponding to the one or more changes to the one or more files may be performed after the last backup and stored at a secondary storage system, such as secondary storage system 112. The one or more changes to the one or more files included in the subsequent backup snapshot may be represented in a corresponding snapshot tree. The one or more changes since a last backup snapshot may be represented in a snapshot tree by initially cloning the snapshot tree corresponding to the last backup, for example, as shown above in FIG. 2B.

The cloned snapshot tree may be modified in a manner that corresponds to the one or more changes to the linked clone VM since the last backup snapshot. To indicate that the one or more changes to the linked clone VM are associated with a subsequent backup snapshot and not associated with the last backup snapshot, a new root node is created. The new root node initially includes the set of pointers included in the root node associated with the last backup snapshot, that is, the new root node includes one or more pointers to an intermediate node or leaf node associated with a previous snapshot tree. However, the new root node includes a view identifier (e.g., TreeID) that is different than the view identifier (e.g., TreeID) of the previous root node. In the example shown, root node 204 has been created and includes pointers to intermediate nodes 212, 214. Root node 204 includes a NodeID of "R2" and a TreeID of "2."

Figure 2D:
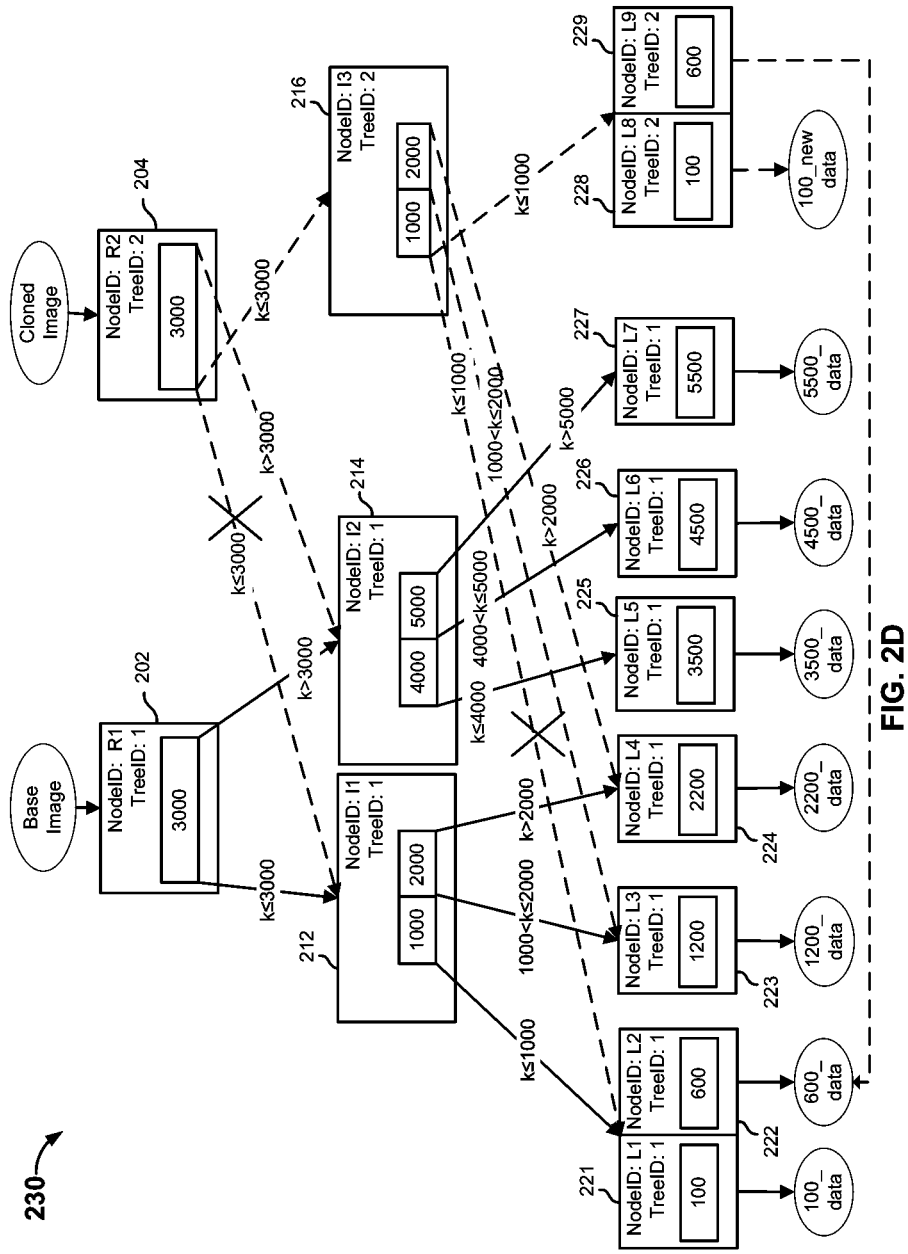
FIG. 2D is a diagram illustrating an embodiment of a modified cloned snapshot tree.

FIG. 2D is a diagram illustrating an embodiment of a modified cloned snapshot tree. In the example shown, tree data structure 230 may be modified by a file system manager, such as file system manager 115.

The one or more changes to the linked clone VM since the last backup snapshot may include a modification to a data block. For example, a data value included in the data block may have been modified. The data block modification may be represented in the tree data structure. A data brick comprises the modified data block. The snapshot tree may be modified to indicate that the data brick comprising the modified data block has changed.

In the example shown, the data brick of "100 data" has been modified to "100 new data" since the last backup snapshot. The snapshot tree corresponding to the subsequent backup snapshot is modified to reflect the modification. As described above, a clone of the last snapshot tree corresponding to the last backup snapshot is performed to generate a snapshot tree corresponding to a subsequent backup snapshot. A new root node corresponding to the subsequent backup snapshot is generated. The new root node includes the same pointers as the root node associated with the last backup snapshot. To modify the snapshot tree associated with the subsequent backup snapshot to reflect that the data brick of "100 data" has been modified to "100 new data," the file system manager traverses the snapshot tree associated the subsequent backup snapshot to identify the data brick associated with the data block. The file system manager starts at root node 204 because that is the root node of the snapshot tree associated with the subsequent backup snapshot. The file system manager traverses tree data structure 230 until it reaches a target node, in this example, leaf node 221. The file system manager compares the view identifier at each traversed intermediate node and leaf node with the view identifier of the root node. In the event the view identifier of a node matches the view identifier of the root node, the file system manager proceeds to the next node. In the event the view identifier of a node does not match the view identifier of the root node, a shadow copy of the node with the non-matching view identifier is made.

For example, to reach a leaf node with a data key of "100," the file system manager begins at root node 204 and proceeds to intermediate node 212. The file system manager compares the view identifier of intermediate node 212 with the view identifier of root node 204, determines that the view identifier of intermediate node 212 does not match the view identifier of root node 204, and creates a copy of intermediate node 212. The intermediate node copy 216 includes the same set of pointers as intermediate node 212, but includes a view identifier of "2" to match the view identifier of root node 204. The file system manager updates a set of pointers of root node 204 to point to intermediate node 216 instead of pointing to intermediate node 212. The file system manager traverses tree data structure 230 from intermediate node 216 to leaf node 221, determines that the view identifier of leaf node 221 does not match the view identifier of root node 204, and creates a copy of leaf node 221. Leaf node copy 228 includes the same view identifier as root node 204, has a new datakey of "100," and includes a pointer to a location of the data block "100 new data." The file system manager updates a pointer of intermediate node 216 to point to leaf node 228 instead of pointing to leaf node 221.

In some embodiments, the file system manager creates a shadow copy of one or more nodes associated a pointer. For example, the file system manager traversed tree data structure 230 from intermediate node 216 to leaf node 221. The file system manager may create a shadow copy of the one or more nodes to which intermediate node 216 points when k≤1000 (e.g., leaf nodes 221, 221).

Figure 2E:
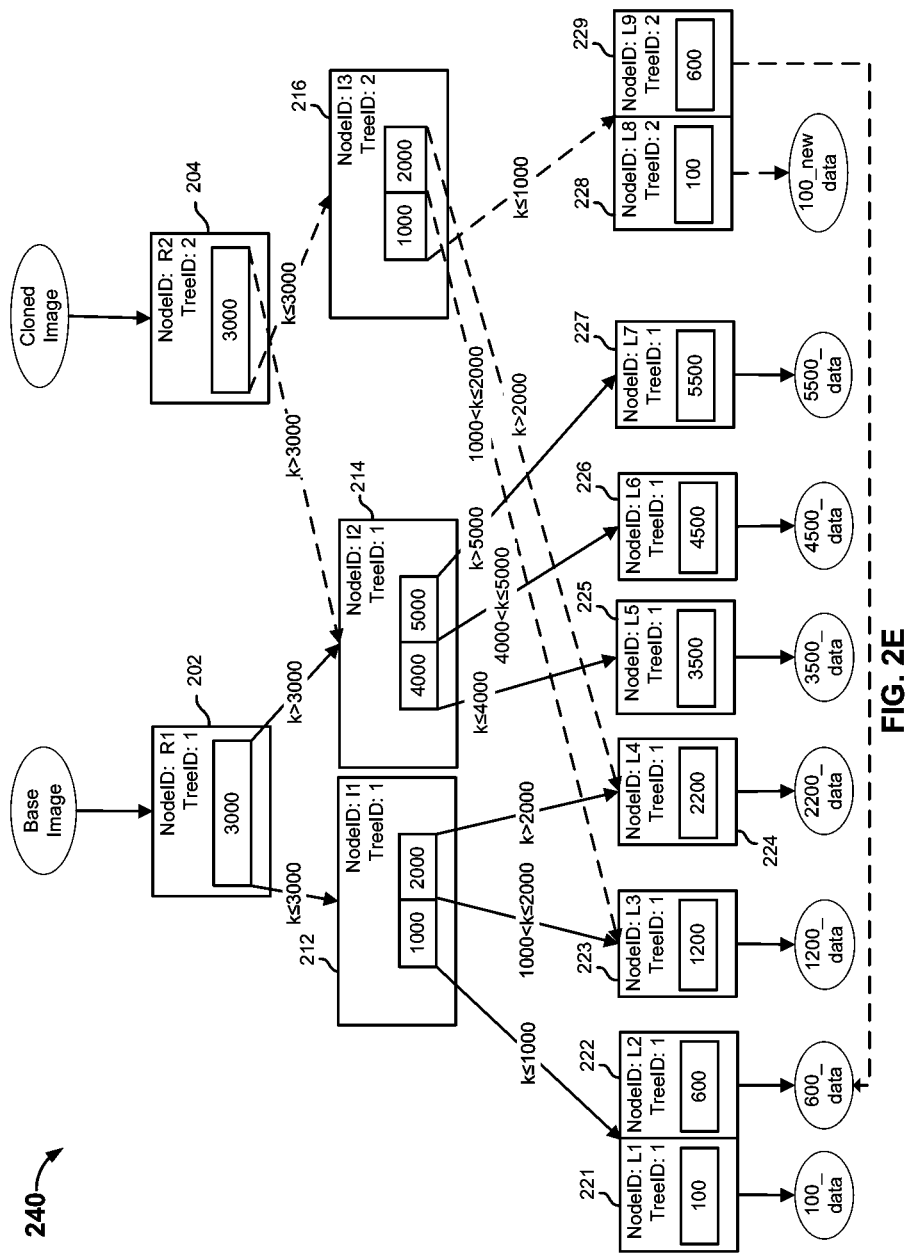
FIG. 2E is a block diagram illustrating an embodiment of a modified snapshot tree of a tree data structure.

FIG. 2E is a block diagram illustrating an embodiment of a modified snapshot tree of a tree data structure. The tree data structure 240 shown in FIG. 2E illustrates a result of the modifications made to tree data structure 230 as described with respect to FIG. 2D.

Figure 3:
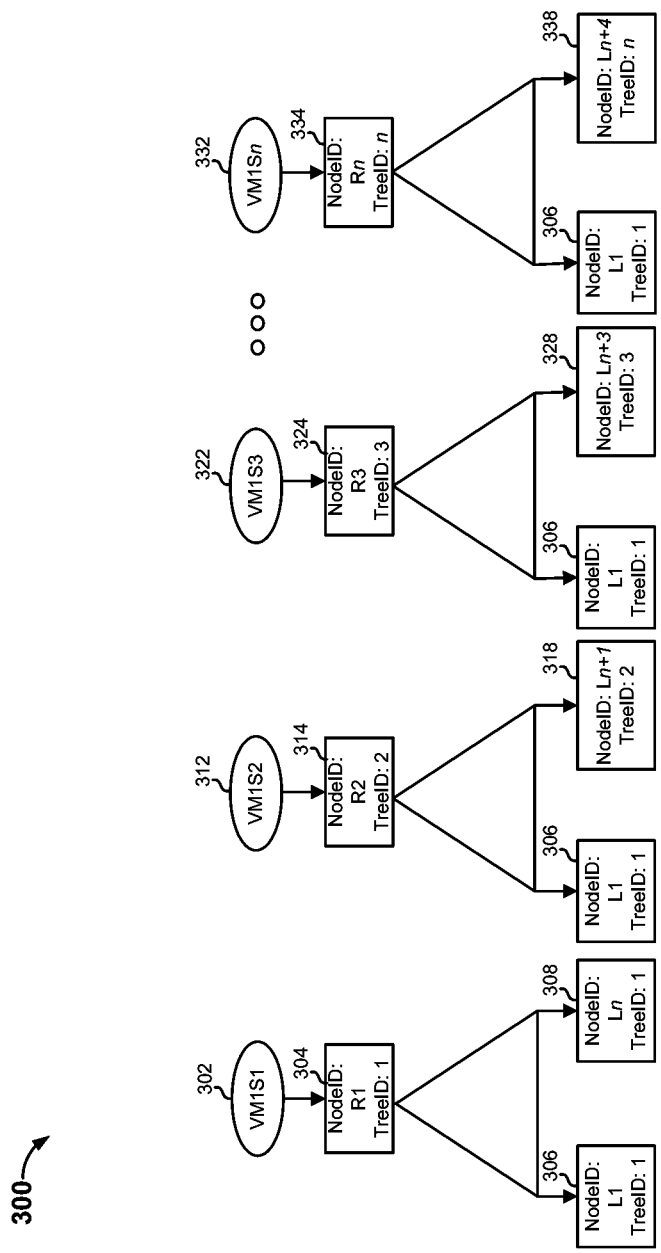
FIG. 3 is a diagram illustrating an embodiment of fully hydrated backup snapshots

FIG. 3 is a diagram illustrating an embodiment of fully hydrated backup snapshots. In the example shown, the fully hydrated backup snapshots 300 may be generated and stored by a secondary storage system, such as secondary storage system 112.

The fully hydrated backup snapshots 300 are comprised of a first backup snapshot 302, a second backup snapshot 312, a third backup snapshot 322, and a nth fully hydrated backup snapshot 332. The fully hydrated backup snapshots 300 may be associated with a first linked clone VM (e.g., VM1), such as one of the one or more linked clone VMs 104. Each backup snapshot is associated with a corresponding snapshot tree. Backup snapshots 302, 312, 322, 332 may correspond to incremental backup snapshots that are incremental changes from a base image of a VM. In some embodiments, backup snapshot 302 corresponds to a base image of a VM. One or more other VMs (e.g., VM2, VM3, VM4, etc.) may also have backup snapshot 302 as a base image.

Backup snapshot 302 is associated with a snapshot tree having a root node 304. The root node of a snapshot tree identifies a backup snapshot with which it is associated. The backup snapshot with which a root node is associated may be determined by the view identifier (e.g., TreeID) associated with the root node. For example, the view identifier of root node 304 is "1," which is associated with a backup snapshot of a linked clone VM (e.g., "VM1S1," which is the first backup snapshot of VM1).

Backup snapshot 312 is associated with a snapshot tree having a root node 314, backup snapshot 322 is associated with a snapshot tree having a root node 324, and backup snapshot 332 is associated with a snapshot tree having a root node 334. The view identifier of root node 314 is "2," which is associated with a backup snapshot of a linked clone VM (e.g., "VM1S2," which is the second backup snapshot of VM1)," the view identifier of root node 324 is "3," which is associated with a backup snapshot of a linked clone VM (e.g., "VM1S3," which is the third backup snapshot of VM1), and the view identifier of root node 334 is "n," which is associated with a backup snapshot of a linked clone VM (e.g., "VM1Sn," which is the nth backup snapshot of VM1).

There may be one or more other fully hydrated backup snapshots associated with other VMs. For example, secondary storage system 112 may store backup snapshots "VM2S4" and "VM3S10," which correspond to the fourth backup snapshot of VM2 and the tenth backup snapshot of VM3, respectively. Secondary storage system 112 may restore a linked clone VM to any point in time for which a corresponding backup snapshot is stored. In some embodiments, secondary storage system 112 is configured to restore a linked clone VM to a point in time for which an associated backup snapshot is stored. For example, secondary storage system 112 may restore a first linked clone VM to any of the backup snapshots VM1S1, VM1S2, VM1S3 ... VM1Sn. In other embodiments, secondary storage system 112 is configured to restore a linked clone VM to a point in time for which any backup snapshot is stored. For example, secondary storage system 112 may restore a first linked clone VM to any of the backup snapshots VM2S1, VM2S2, VM2S3 ... VM2Sn or VM3S1, VM3S2, VM3S3 ... VM3Sn.

Root node 304 is associated with one or more levels of intermediate nodes (not shown) and a plurality of leaf nodes. Although leaf nodes 306, 308 are shown, the snapshot tree may have a plurality of other leaf nodes. Because root node 304 is associated with a full backup snapshot, traversing the snapshot tree from root node 304 to each of the leaf nodes will reach a leaf node having a view identifier that matches the view identifier associated with root node 304.

Root node 314 is associated with one or more levels of intermediate nodes (not shown) and a plurality of leaf nodes. Although leaf nodes 306, 318 are shown, the snapshot tree may have a plurality of other leaf nodes. Because root node 314 is associated with an incremental backup snapshot, traversing the snapshot tree from root node 314 will arrive at one or more leaf nodes associated with backup snapshot VM1S1 and one or more leaf nodes associated with backup snapshot VM1S2. The one or more nodes that are associated with backup snapshot VM1S2 may be determined by comparing a view identifier of a node with the view identifier of the root node. In the event the view identifier of a node matches the view identifier of root node, then the node is determined to be associated with backup snapshot VM1S2. In the event the view identifier of a node does not match the view identifier of the root node, then the node is determined to be associated with backup snapshot VM1S1. For example, leaf node 306 is associated with backup snapshot VM1S1 because leaf node 306 has a view identifier that matches the view identifier of the root node associated with backup snapshot VM1S1. Leaf node 318 is associated with backup snapshot VM1S2 because leaf node 318 has a view identifier that matches the view identifier of the root node associated with backup snapshot VM1S2.

Root node 324 is associated with one or more levels of intermediate nodes (not shown) and a plurality of leaf nodes. Although leaf nodes 306, 328 are shown, the snapshot tree may have a plurality of other leaf nodes. Because root node 324 is associated with an incremental backup snapshot, traversing the snapshot tree from root node 324 may arrive at one or more leaf nodes associated with backup snapshot VM1S1, one or more leaf nodes associated with backup snapshot VM1S2, and/or one or more leaf nodes associated with backup snapshot VM1S3. The one or more nodes that are associated with backup snapshot VM1S3 may be determined by comparing a view identifier of a node with the view identifier of the root node. In the event the view identifier of a node matches the view identifier of root node, then the node is determined to be associated with backup snapshot VM1S3. In the event the view identifier of a node does not match the view identifier of the root node, then the node is determined to be associated with a previous backup snapshot. For example, leaf node 306 is associated with backup snapshot VM1S1 because leaf node 306 has a view identifier that matches the view identifier of the root node associated with backup snapshot VM1S1. Leaf node 328 is associated with backup snapshot VM1S3 because leaf node 328 has a view identifier that matches the view identifier of the root node associated with backup snapshot VM1S3.

Root node 334 is associated with one or more levels of intermediate nodes (not shown) and a plurality of leaf nodes. Although leaf nodes 306, 338 are shown, the snapshot tree may have a plurality of other leaf nodes. Because root node 334 is associated with an incremental backup snapshot, traversing the snapshot tree from root node 334 may arrive at one or more leaf nodes associated with backup snapshot VM1S1, one or more leaf nodes associated with backup snapshot VM1S2, one or more leaf nodes associated with backup snapshot VM1S3, one or more leaf nodes associated with backup snapshots that were performed between backup snapshot VM1S3 and backup snapshot VM1Sn, and/or one or more leaf nodes associated with backup snapshot VM1Sn. The one or more nodes that are associated with backup snapshot VM1Sn may be determined by comparing a view identifier of a node with the view identifier of the root node. In the event the view identifier of a node matches the view identifier of root node, then the node is determined to be associated with backup snapshot VM1Sn. In the event the view identifier of a node does not match the view identifier of the root node, then the node is determined to be associated with a previous backup snapshot. For example, leaf node 306 is associated with backup snapshot VM1S1 because leaf node 306 has a view identifier that matches the view identifier of the root node associated with backup snapshot VM1S1. Leaf node 338 is associated with backup snapshot VM1Sn because leaf node 338 has a view identifier that matches the view identifier of the root node associated with backup snapshot VM1Sn.

Differences between backup snapshots may be determined by traversing the corresponding snapshot trees and determining the one or more nodes that are not shared between the corresponding snapshot trees. For example, the differences between the backup snapshot VM1S3 and backup snapshot VM1Sn may be determined by traversing the snapshot tree associated with root node 324 and traversing the snapshot tree associated with root node 334. Leaf nodes that are not shared by the two snapshot trees may identified. The leaf nodes that are not shared by the two snapshot trees correspond to bricks of data. A data brick is comprised of one or more data blocks. The one or more data blocks corresponding to the leaf nodes not shared by the two snapshot trees may be identified and provided from a secondary storage system to a primary system.

In some embodiments, one or more nodes that are included in the first snapshot tree, but are not included in a second snapshot tree are identified. For example, one or more nodes that are included in the snapshot tree associated with root node 324, but are not included in the snapshot tree associated with root node 304 are identified. The one or more identified nodes may include one or more leaf nodes. The one or more leaf nodes correspond to bricks of data. A data brick is comprised of one or more data blocks. The one or more data blocks corresponding to the leaf nodes that are included in the first snapshot tree, but are not included in the second snapshot tree may be identified and provided from a secondary storage system to a primary system. For example, the one or more data blocks corresponding to the leaf nodes that are included in the snapshot tree associated with root node 324, but are not included in the snapshot tree associated with root node 304 may be identified and provided from a secondary storage system to a primary system.

Figure 4:
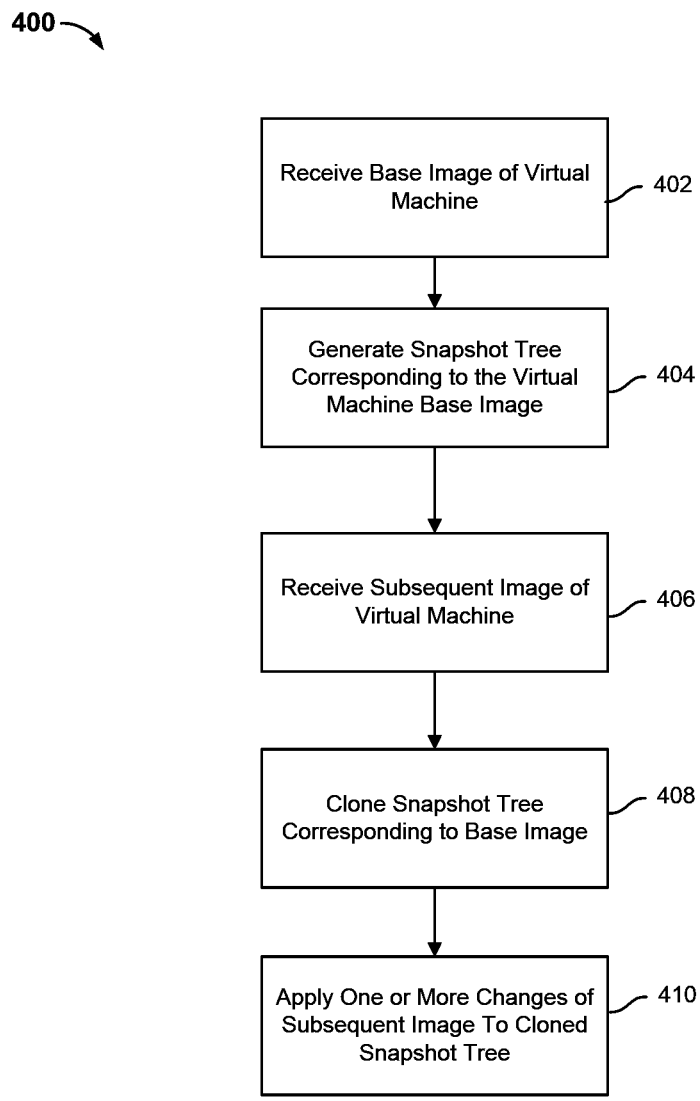
FIG. 4 is a flow chart illustrating an embodiment of a process for backing up a linked clone VM.

FIG. 4 is a flow chart illustrating an embodiment of a process for backing up a linked clone VM. In the example shown, process 400 may be performed by a secondary storage system, such as secondary storage system 112.

At 402, a base image of a linked clone VM is received from a primary system. The primary system may perform a full backup snapshot of a parent VM (e.g., the VM with which the linked clone VM is associated). The full backup snapshot corresponds to a base image of the linked clone VM.

At 404, a snapshot tree corresponding to the base image of the linked clone VM is generated. The base image is comprised of VM data. A secondary storage system is configured to store the VM data and organize the VM data in a tree data structure. An example of the tree data structure is a snapshot tree (e.g., Cohesity Snaptree), which may be based on a B+ tree structure (or other type of tree structure in other embodiments). The snapshot tree may be comprised of a root node, one or more levels of intermediate nodes, and one or more leaf nodes.

At 406, a subsequent image of the linked clone VM is received. The primary system may perform a backup snapshot of the linked clone VM. The backup snapshot may be an incremental snapshot or a full snapshot. The backup snapshot corresponds to the subsequent image of the linked clone VM.

At 408, the snapshot tree corresponding to the base image is cloned. The clone of the snapshot tree corresponding to the base image may be generated by causing the new backup snapshot to point to a root node associated with the snapshot tree corresponding to the base image.

At 410, one or more changes of the subsequent image of the linked clone VM are applied to the cloned snapshot tree. The cloned snapshot tree may be modified in a manner that corresponds to the one or more changes of the subsequent image of the linked clone VM, e.g., the one or more changes to the linked clone VM image since the last backup snapshot. To indicate that the one or more changes to the linked clone VM image are associated with a subsequent backup snapshot and not associated with the last backup snapshot (e.g., the base image), a new root node is created. The new root node initially includes the set of pointers included in the root node associated with the last backup snapshot, that is, the new root node includes one or more pointers to an intermediate node or leaf node associated with a previous snapshot tree. However, the new root node includes a view identifier (e.g., TreeID) that is different than the view identifier (e.g., TreeID) of the previous root node.

To modify the cloned snapshot tree to reflect that a change of the one or more changes of the linked clone VM image, the file system manager traverses the cloned snapshot tree to identify the data brick associated with the changed data block. The file system manager starts at the root node copy because that is the root node of the cloned snapshot tree. The file system manager traverses the tree data structure until it reaches a target node, e.g., a leaf node that corresponds to a changed data brick. The file system manager compares the view identifier at each traversed intermediate node and leaf node with the view identifier of the root node. In the event the view identifier of a node matches the view identifier of the root node, the file system manager proceeds to the next node. In the event the view identifier of a node does not match the view identifier of the root node, a shadow copy of the node with the non-matching view identifier is made. Upon reaching the leaf node corresponding to the data block that has changed, the file system manager generates a leaf node copy that includes a pointer to the changed data block.

Figure 5:
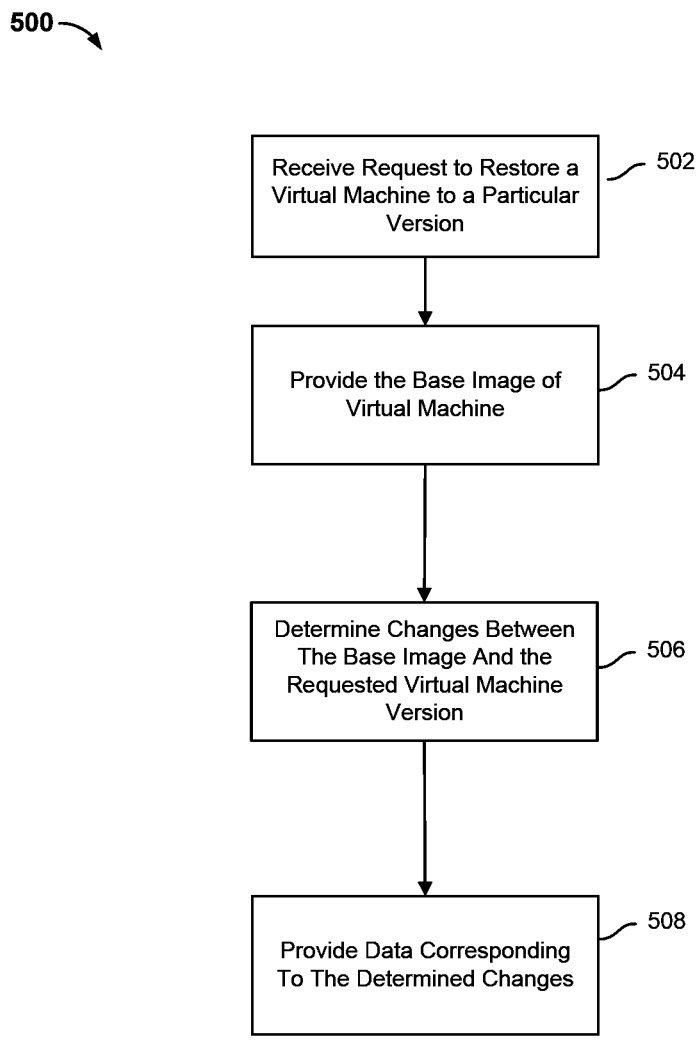
FIG. 5 is a flow chart illustrating an embodiment of a process for restoring a linked clone VM.

FIG. 5 is a flow chart illustrating an embodiment of a process for restoring a linked clone VM. In the example shown, process 500 may be performed by a secondary storage system, such as secondary storage system 112.

At 502, a request to restore a linked clone VM to a particular version (e.g., previous version) is received. The requested linked clone VM version corresponds to a backup snapshot. The request may be received from a primary system, such as primary system 102. The request may be received by a remote system on behalf of another system, such as primary system 102.

At 504, a base image corresponding to the linked clone VM version is provided. The base image may be associated with a parent VM that the linked clone VM is associated. The base image corresponding to the linked clone VM version has a corresponding snapshot tree. The snapshot tree corresponding to the base image is traversed to the one or more leaf nodes to identify one or more data bricks. The identified data bricks correspond to a plurality of data blocks. The plurality of data blocks are provided to a destination system e.g., primary system.

At 506, one or more changes between the base image and the requested linked clone VM version are determined. The base image of the requested linked clone VM corresponds to a first snapshot tree and the requested linked clone VM version corresponds to a second snapshot tree. The first and second snapshot tree are traversed to determine one or more leaf nodes that are not shared between the snapshot trees. The determined one or more leaf nodes correspond to one or more data bricks. The one or more corresponding data bricks include one or more data blocks. These data blocks correspond to the one or more changes between the base image and the requested linked clone VM version. At 508, the data blocks are provided to the destination system.

Figure 6:
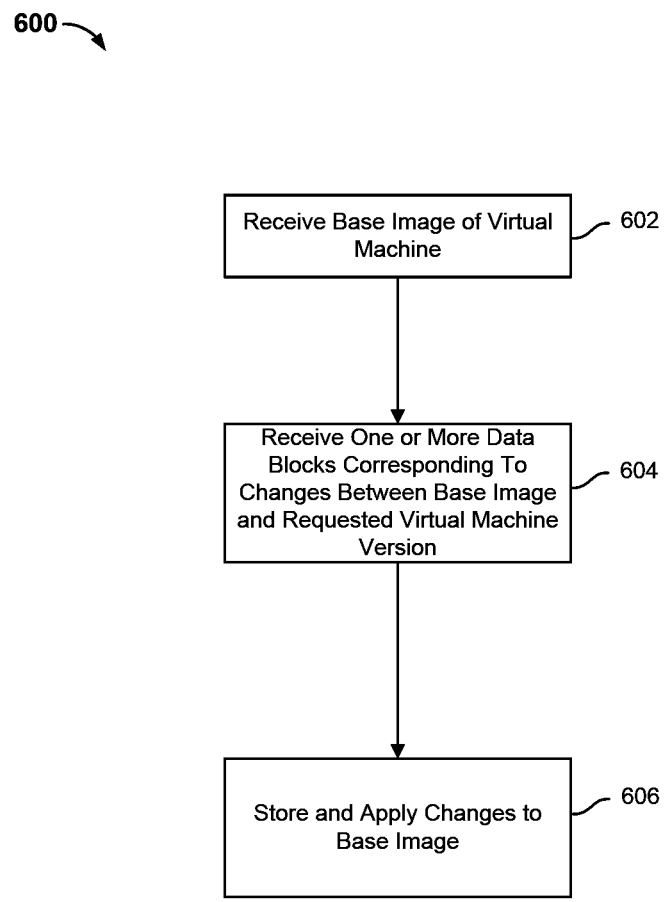
FIG. 6 is a flow chart illustrating an embodiment of a process for restoring a linked clone VM.

FIG. 6 is a flow chart illustrating an embodiment of a process for restoring a linked clone VM. In the example shown, process 600 may be performed by a primary system, such as primary system 102.

At 602, a base image of a linked clone VM is received. The base image is comprised of a plurality of data blocks. The data blocks are stored on the primary system. The base image may be a base image of a parent VM with which the linked clone VM is associated.

At 604, one or more data blocks corresponding to changes between the base image of the linked clone VM and the requested linked clone VM version are received.

At 606, the one or more data blocks corresponding to changes between the base image of the parent VM and the requested linked clone VM version are stored and applied to the base image.

Figure 7:
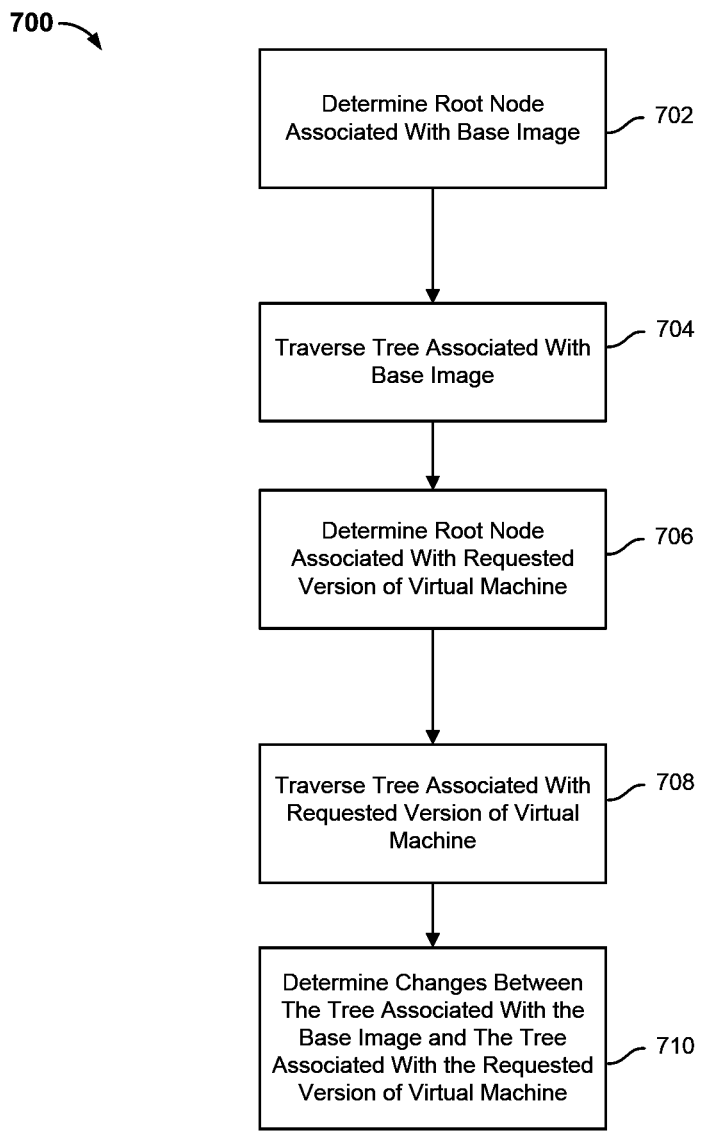
FIG. 7 is a flow chart illustrating an embodiment of a process for determining changes between a base image of a parent VM and a requested linked clone VM version to be restored.

FIG. 7 is a flow chart illustrating an embodiment of a process for determining changes between a base image of a parent VM and a requested linked clone VM version to be restored. In the example shown, process 700 may be performed by a file system manager, such as file system manager 115. Process 700 may be implemented to perform some or all of 506 of process 500.

At 702, a root node associated with a snapshot tree corresponding to the base image is determined.

At 704, the snapshot tree corresponding to the base image is traversed from the root node associated with the snapshot tree corresponding to the base image to each node of the snapshot tree snapshot tree corresponding to the base image.

At 706, a root node associated with a requested linked clone VM version to be restored is determined. The requested linked clone VM version to be restored is associated with a snapshot tree. The associated snapshot tree has a root node that corresponds to the requested linked clone VM version to be restored.

At 708, the snapshot tree associated with the requested linked clone VM version to be restored is traversed from the root node associated with the requested linked clone VM version to be restored to each node of the snapshot tree associated the requested linked clone VM version.

At 710, one or more changes between the snapshot tree associated with the requested linked VM version to be restored and the snapshot tree corresponding to the base image are determined.

The snapshot tree associated with the requested linked clone VM version to be restored is determined to have changed in the event the snapshot tree associated with the requested linked clone VM version to be restored has one or more nodes that are not accessible from the root node of the snapshot tree corresponding to the base image. For example, the snapshot tree associated with the requested linked clone VM version to be restored may be traversed from the root node associated with the requested linked clone VM version to be restored to each of the nodes of the snapshot tree. In the event the snapshot tree associated with the requested linked clone VM version to be restored is traversed to one or more nodes not included in the snapshot tree associated with the base image, the snapshot tree associated with the requested linked clone VM version is determined to have changed. The one or more changes may correspond to leaf nodes that are not included in both snapshot trees. The leaf nodes correspond to a data brick stored on the secondary storage system. The one or more data blocks corresponding to the leaf nodes are determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
  receive from a primary system a base image of a parent virtual machine;
  store the base image of the parent virtual machine across one or more nodes;
  generate a snapshot tree corresponding to the base image of the parent virtual machine;
  generate a snapshot tree associated with a previous version of a linked clone virtual machine;
  receive one or more images of the linked clone virtual machine, wherein the one or more images of the linked clone virtual machine corresponding to a particular version of the linked clone virtual machine;
  generate one or more corresponding snapshot trees for the one or more images of the linked clone virtual machine, wherein at least one of the one or more corresponding snapshot trees is generated in part by cloning the snapshot tree corresponding to the base image of the parent virtual machine;
  receive a request associated with restoring the previous version of the linked clone virtual machine, wherein the linked clone virtual machine is linked to the parent virtual machine;
  determine one or more changes between the base image of the parent virtual machine and the previous version of the linked clone virtual machine based at least in part on the snapshot tree corresponding to the base image of the parent virtual machine and the snapshot tree associated with the previous version of the linked clone virtual machine; and
  provide to a remote system one or more data blocks corresponding to the base image of the parent virtual machine and one or more data blocks corresponding to the determined changes; and
a memory coupled to the processor and configured to provide the processor with instructions.

2. The system of claim 1, wherein the determined one or more changes are determined based in part on a view identifier associated with the snapshot tree corresponding to the base image of the parent virtual machine and a view identifier associated with the snapshot tree associated with the previous version of the linked clone virtual machine.

3. The system of claim 1, wherein the snapshot tree corresponding to the base image of the parent virtual machine is linked to the one or more corresponding snapshot trees for the one or more images of the linked clone virtual machine.

4. The system of claim 1, wherein the processor is configured to determine the one or more changes between the base image of the parent virtual machine and the previous version of the linked clone virtual machine at least in part by:
  traversing the snapshot tree corresponding to the base image of the parent virtual machine;
  traversing the snapshot tree associated with the previous version of the linked clone virtual machine; and
  determining one or more nodes that are not shared between the snapshot tree associated with the base image of the parent virtual machine and the snapshot tree associated with the previous version of the linked clone virtual machine.

5. The system of claim 4, wherein the snapshot tree corresponding to the base image of the parent virtual machine includes a root node, one or more levels of one or more intermediate nodes, and a plurality of leaf nodes.

6. The system of claim 4, wherein at least one node of the snapshot tree associated with the previous version of the linked clone virtual machine references at least one node of the snapshot tree corresponding to the base image of the parent virtual machine.

7. The system of claim 1, wherein the remote system is configured to:
  receive the one or more data blocks corresponding to the base image and one or more data blocks corresponding to the determined changes; and
  apply the one or more data blocks corresponding to the determined changes to the one or more data blocks corresponding to the base image.

8. A method, comprising:
receiving from a primary system a base image of a parent virtual machine;
storing the base image of the parent virtual machine across one or more nodes;
generating a snapshot tree corresponding to the base image of the parent virtual machine;
generating a snapshot tree associated with a previous version of a linked clone virtual machine;
receiving one or more images of the linked clone virtual machine, wherein the one or more images of the linked clone virtual machine corresponding to a particular version of the linked clone virtual machine;
generating one or more corresponding snapshot trees for the one or more images of the linked clone virtual machine, wherein at least one of the one or more corresponding snapshot trees is generated in part by cloning the snapshot tree corresponding to the base image of the parent virtual machine;
receiving a request associated with restoring the previous version of the linked clone virtual machine, wherein the linked clone virtual machine is linked to the parent virtual machine;
determining one or more changes between the base image of the parent virtual machine and the previous version of the linked clone virtual machine based at least in part on the snapshot tree corresponding to the base image of the parent virtual machine and the snapshot tree associated with the previous version of the linked clone virtual machine; and
providing to a remote system one or more data blocks corresponding to the base image of the parent virtual machine and one or more data blocks corresponding to the determined changes.

9. The method of claim 8, wherein the determined one or more changes are determined based in part on a view identifier associated with the snapshot tree corresponding to the base image of the parent virtual machine and a view identifier the snapshot tree associated with the previous version of the linked clone virtual machine.

10. The method of claim 8, wherein the snapshot tree corresponding to the base image of the parent virtual machine is linked to the one or more corresponding snapshot trees for the one or more images of the linked clone virtual machine.

11. A computer program product, the computer program product being embodied in a non-transitory computer readable storage medium and comprising computer instructions for:

receiving from a primary system a base image of a parent virtual machine;

storing the base image of the parent virtual machine across one or more nodes;

generating a snapshot tree corresponding to the base image of the parent virtual machine;

generating a snapshot tree associated with a previous version of a linked clone virtual machine;

receiving one or more images of the linked clone virtual machine, wherein the one or more images of the linked clone virtual machine corresponding to a particular version of the linked clone virtual machine;

generating one or more corresponding snapshot trees for the one or more images of the linked clone virtual machine, wherein at least one of the one or more corresponding snapshot trees is generated in part by cloning the snapshot tree corresponding to the base image of the parent virtual machine;

receiving a request associated with restoring the previous version of the linked clone virtual machine, wherein the linked clone virtual machine is linked to the parent virtual machine;

determining one or more changes between the base image of the parent virtual machine and the previous version of the linked clone virtual machine based at least in part on the snapshot tree corresponding to the base image of the parent virtual machine and the snapshot tree associated with the previous version of the linked clone virtual machine; and providing to a remote system one or more data blocks corresponding to the base image of the parent virtual machine and one or more data blocks corresponding to the determined changes.

\* \* \* \* \*

UNITED STATES PATENT AND TRADEMARK OFFICE
CERTIFICATE OF CORRECTION

PATENT NO. : 10,275,321 B1
APPLICATION NO. : 15/991766
DATED : April 30, 2019
INVENTOR(S) : Rupesh Bajaj Page 1 of 1

It is certified that error appears in the above-identified patent and that said Letters Patent is hereby corrected as shown below:

In the Specification

In Column 7, Line 9, delete ""100 data"" and insert --"100_data"--, therefor.
In Column 9, Lines 7-8, delete ""100 data."" and insert --"100_data."--, therefor.
In Column 9, Lines 14-15, delete ""600 data." and insert --"600_data."--, therefor.
In Column 9, Lines 21-22, delete ""1200 data."" and insert --"1200_data."--, therefor.
In Column 9, Lines 28-29, delete ""2200 data."" and insert --"2200_data."--, therefor.
In Column 9, Lines 35-36, delete ""3500 data."" and insert --"3500_data."--, therefor.
In Column 9, Lines 42-43, delete ""4500 data."" and insert --"4500_data."--, therefor.
In Column 9, Lines 49-50, delete ""5500 data."" and insert --"5500_data."--, therefor.
In Column 11, Line 4, delete ""100 data"" and insert --"100_data"--, therefor.
In Column 11, Line 5, delete ""100 new data"" and insert --"100_ new data"--, therefor.
In Column 11, Line 16, delete ""100 data"" and insert --"100_data"--, therefor.
In Column 11, Line 16, delete ""100 new data,"" and insert --"100_new data,"--, therefor.
In Column 11, Line 51, delete ""100 new data."" and insert --"100_new data."--, therefor.

Signed and Sealed this
Third Day of December, 2019

Andrei Iancu
*Director of the United States Patent and Trademark Office*